US008207983B2

(12) United States Patent
Taneja et al.

(10) Patent No.: US 8,207,983 B2
(45) Date of Patent: Jun. 26, 2012

(54) OVERLAYING VIDEOS ON A DISPLAY DEVICE

(75) Inventors: Salil Taneja, Uttar Pradesh (IN); Gaurav Jairath, Delhi (IN); Sachin Gupta, Haryana (IN); Rohit Kumar Jain, Uttar Pradesh (IN)

(73) Assignee: STMicroelectronics International N.V., Amsterdam (NL)

( * ) Notice: Subject to any disclaimer, the term of this patent is extended or adjusted under 35 U.S.C. 154(b) by 658 days.

(21) Appl. No.: 12/388,420

(22) Filed: Feb. 18, 2009

(65) Prior Publication Data

US 2010/0207957 A1 Aug. 19, 2010

(51) Int. Cl.

| | |
|---|---|
| ***G09G 5/00*** | (2006.01) |
| ***G09G 5/02*** | (2006.01) |
| ***G09G 5/36*** | (2006.01) |
| ***G06T 1/00*** | (2006.01) |
| ***H04N 7/00*** | (2006.01) |
| ***H04N 9/74*** | (2006.01) |
| ***G06K 9/40*** | (2006.01) |
| *G06K 9/36* | (2006.01) |
| *H04N 1/387* | (2006.01) |

(52) U.S. Cl. ........ 345/592; 345/589; 345/629; 345/501; 345/545; 348/552; 348/584; 348/563; 358/450; 382/162; 382/254; 382/274; 382/276

(58) Field of Classification Search .................. 345/418, 345/581, 589, 592, 620, 629–630, 501, 545; 348/552, 584, 563–569, 585–599; 358/505–507, 358/447–448, 518, 450; 382/162, 166, 254, 382/274, 276, 283–284, 300

See application file for complete search history.

(56) References Cited

U.S. PATENT DOCUMENTS

| | | | | |
|---|---|---|---|---|
| 5,070,467 | A * | 12/1991 | Todome | 345/502 |
| 6,388,668 | B1 * | 5/2002 | Elliott | 345/474 |
| 2003/0001857 | A1 * | 1/2003 | Doyle | 345/582 |
| 2006/0244839 | A1 * | 11/2006 | Glatron et al. | 348/211.11 |
| 2007/0146392 | A1 * | 6/2007 | Feldman et al. | 345/660 |
| 2008/0256640 | A1 * | 10/2008 | Tobita et al. | 726/26 |
| 2008/0301546 | A1 * | 12/2008 | Moore et al. | 715/243 |
| 2010/0045858 | A1 * | 2/2010 | Larsen et al. | 348/441 |
| 2010/0169666 | A1 * | 7/2010 | Dewan et al. | 713/190 |

* cited by examiner

*Primary Examiner* — Wesner Sajous

(57) ABSTRACT

The embodiments of the present disclosure teach overlaying videos on a display device. The technique involves one or more buffers at input such as a first buffer (Primary Buffer) and an overlay buffer, a blitting module, a second buffer (Frame Buffer), and a display screen. The first buffer provides a first image data to the blitting module and the overlay buffer provides a second image data to the blitting module. The embodiments of the present disclosure demonstrate overlaying the second image on the first image with enhanced configurable functionality (like stretching, clipping, color keying, Alpha Blending and Raster Operation) if required, without modifying the Primary Buffer without the need of any overlay support in hardware.

20 Claims, 19 Drawing Sheets

Tetra Buffering

First Flip

OVERLAYING VIDEOS ON A DISPLAY DEVICE

TECHNICAL FIELD

The present disclosure relates to display of videos on a display device and more specifically to a method for overlaying of videos, animations and moving images on a display device.

BACKGROUND

The terms "Buffer" and "Surface" have been used interchangeably throughout the disclosure and refer to a contiguous linear array of physical RAM.

Electronic display devices can be configured to display videos from multiple sources. For example, a computer is enabled to receive signals from multiple video sources. The computer blends the signals to produce a single video image and provides it to a display monitor.

A configurable interactive device such as computer, Mobile Phone and PDA comprises a Primary Surface (also referred to as the memory buffer) on which the OS/application performs Graphics Operations. In most devices, the Primary Surface is same as the Frame Buffer.

The contents of Frame Buffer/Primary Surface can be manipulated at will by means of read-write-modify operations. The interactive device requires a physical display such as a LCD monitor to display its output. The contents of the frame buffer are translated into screen pixels by a Display Controller/Graphics Card by a process referred to as Rasterization.

SUMMARY

A display subsystem in accordance with the present disclosure is illustrated in FIG. 1. The physical display 101 of the system with a display controller 102 used during rasterization. The system functions by means of a central processor 104 coupled to RAM 103. RAM 103 further comprises the Frame Buffer 103(*a*). All components are operatively coupled to each other and function according to the above mentioned description.

FIG. 2 illustrates a Display Subsystem as shown in FIG. 1 with an addition of a Graphics Processor. Through a graphics coprocessor 205, the graphics software running on the central processor 104 performs modification of the Frame buffer 103(*a*) in the RAM 103.

In some cases, the Graphics Coprocessor has its own Video Memory configured as Frame Buffer. In such cases, the Graphics Coprocessor interacts with RAM 103, but rasterization is done from Frame Buffer in Video Memory itself. FIG. 3 illustrates this case. Here the Frame Buffer 306(*a*) is present in Video Memory 306 itself.

FIG. 4 illustrates a hardware overlay technique for rendering an image to a display screen. A frame buffer 402, an overlay buffer 404, and a display screen 406 are shown in FIG. 4. While rasterizing, the content of overlay buffer 404 is placed on the content of frame buffer 402, which is displayed on the display screen 406, without actually modifying the contents of Frame buffer 402. A display hardware/coprocessor/graphics card generates a combination of the frame buffer 402 and the overlay buffer 404 on the display screen. This is achieved by scanning data through controller from the frame buffer 402 and the overlay buffer 404. The hardware overlay technique requires hardware support for synchronizing and executing the overlaying of images.

Other technical features may be readily apparent to one skilled in the art from the following figures, descriptions and claims.

BRIEF DESCRIPTION OF DRAWINGS

For a more complete understanding of this disclosure and its features, reference is now made to the following description, taken in conjunction with the accompanying drawings, in which:

FIG. 11(*b*) describes a diagrammatic representation of a system for overlaying videos using Destination Color Key Transparency according to yet another embodiment of the present disclosure;

FIG. 12(*b*) describes a diagrammatic representation of a system for overlaying videos using Destination Color Key Transparency according to yet another embodiment of the present disclosure;

DETAILED DESCRIPTION

Figure 1:
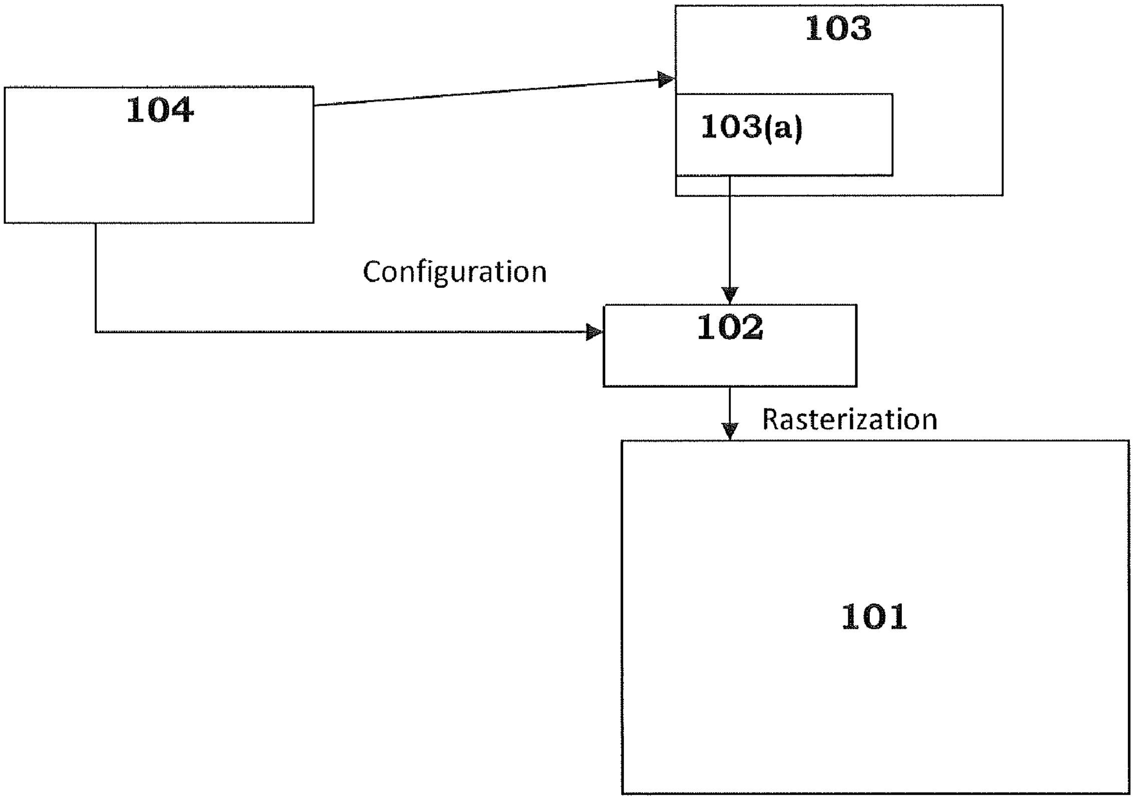
FIG. 1 illustrates a display subsystem.
Figure 2:
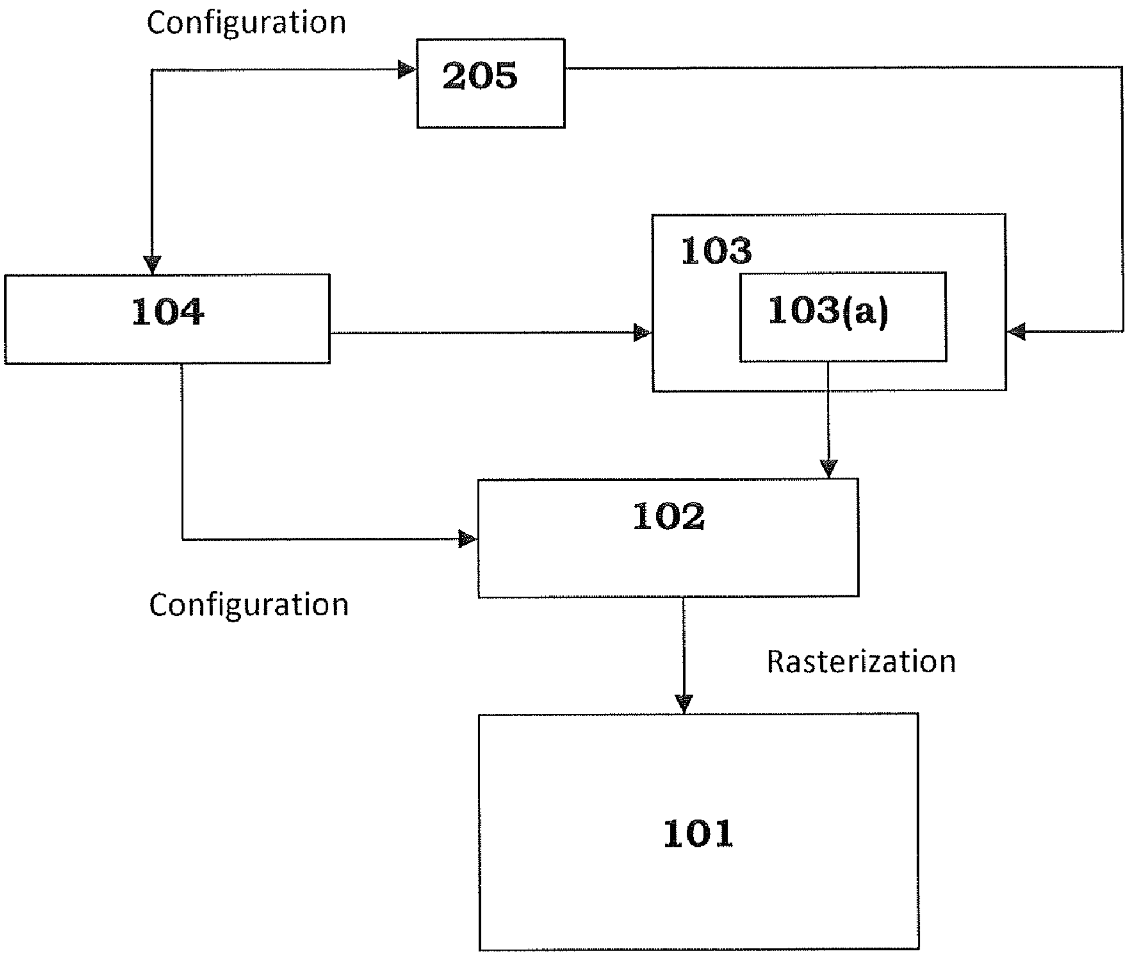
FIG. 2 illustrates an alternate display subsystem.
Figure 3:
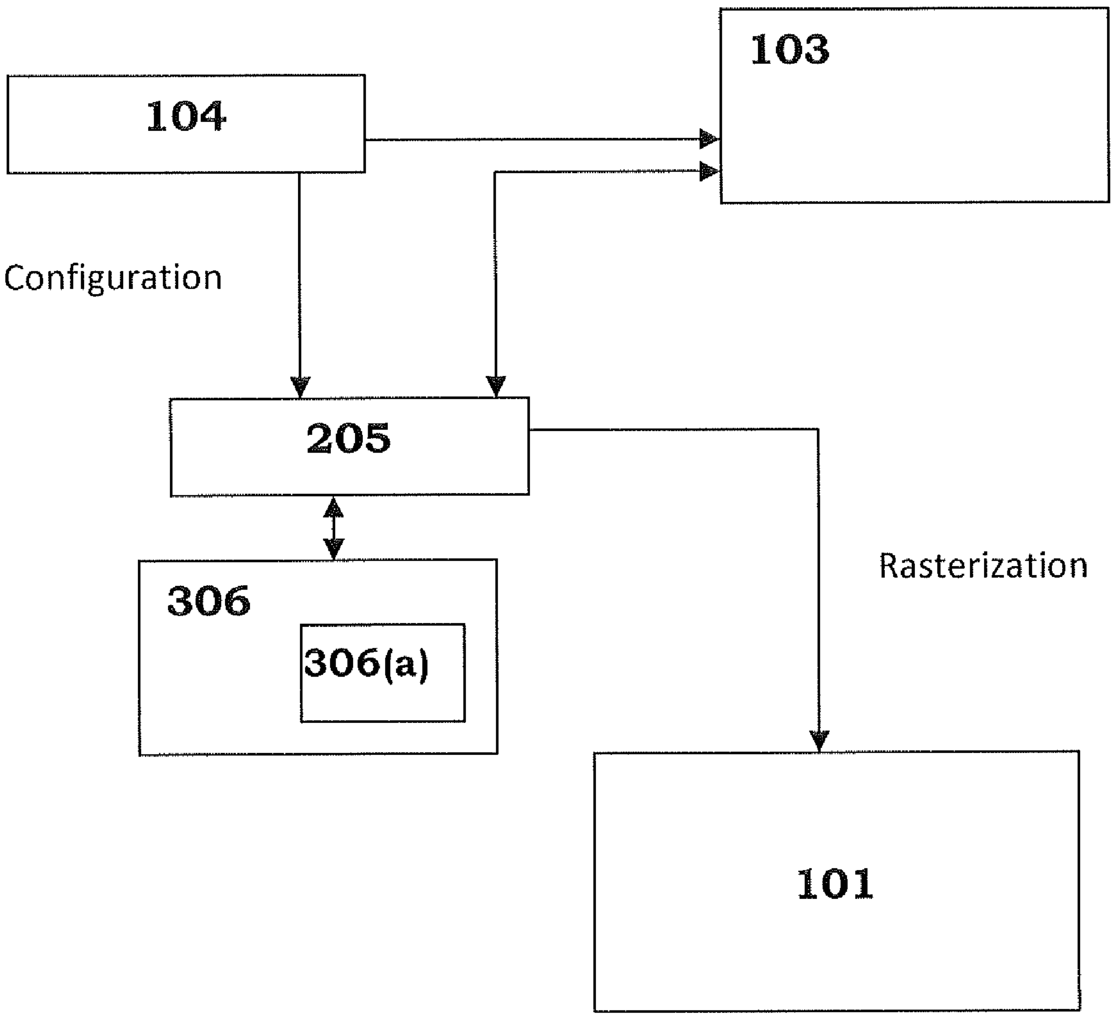
FIG. 3 illustrates a yet another display subsystem.
Figure 4:
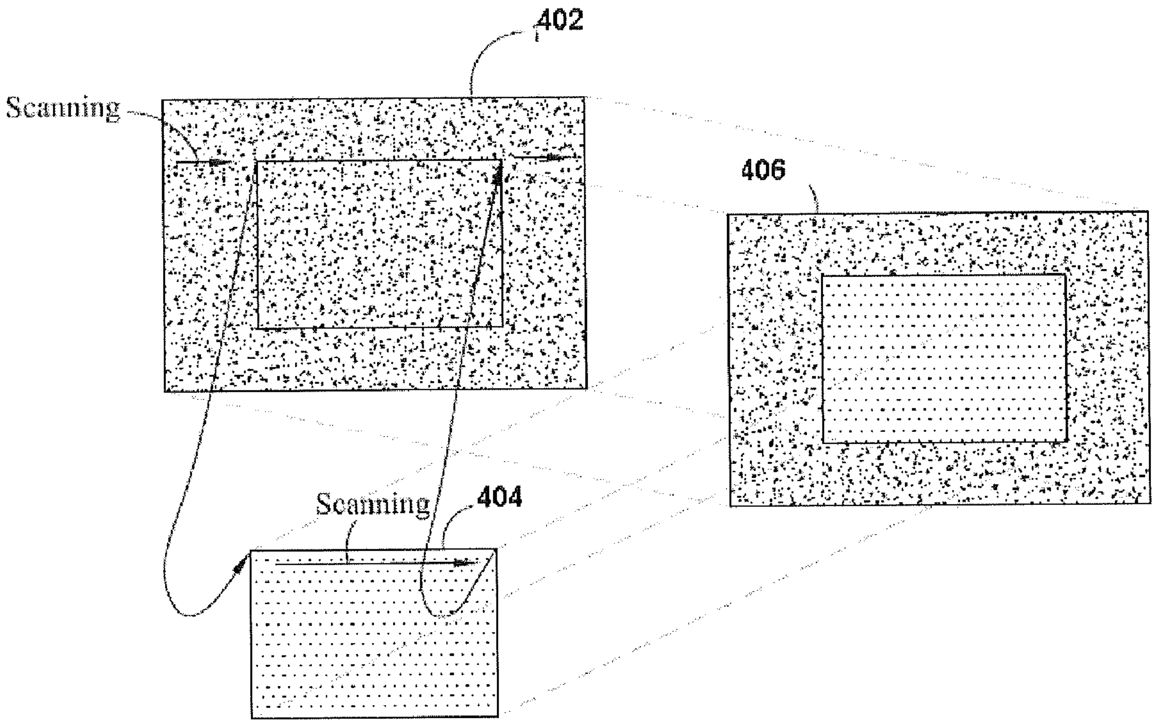
FIG. 4 illustrates an overlay subsystem.

The embodiments of the present disclosure will be described in detail with reference to the accompanying drawings. However, the present disclosure is not limited to these embodiments. The present disclosure can be modified in various forms. The embodiments of the present disclosure described herein are only provided to explain more clearly the present disclosure to the ordinarily skilled in the art. In the accompanying drawings, like reference numerals are used to indicate like components.

The present disclosure refers to display of videos/moving images/animations from multiple sources simultaneously on the display device without hardware support or with minimum hardware support. A copy of Primary Buffer is created which is then configured as a Frame Buffer. It is the Frame Buffer that is actually rasterized. This ensures that the operating system updates and performs graphic operations on the Primary Buffer. The system described in various embodiments of the present disclosure comprise a Blitting Module which periodically performs blitting of Overlay buffer and Primary Buffer according to one or more blending modes on the Frame buffer. There are five blending modes which have been taken into account in the present disclosure i.e. source color key, destination color key, destination rectangle based blitting, ROP based blitting and Alpha blending.

A source color key is used to designate fully transparent pixels within the source image. A destination color key is used to designate the regions of the destination surface that can be modified by the blit. Alpha blending is a more sophisticated blending mechanism because it can designate partially transparent source pixels, in contrast to the all-or-none transparency of color keying.

Figure 5:
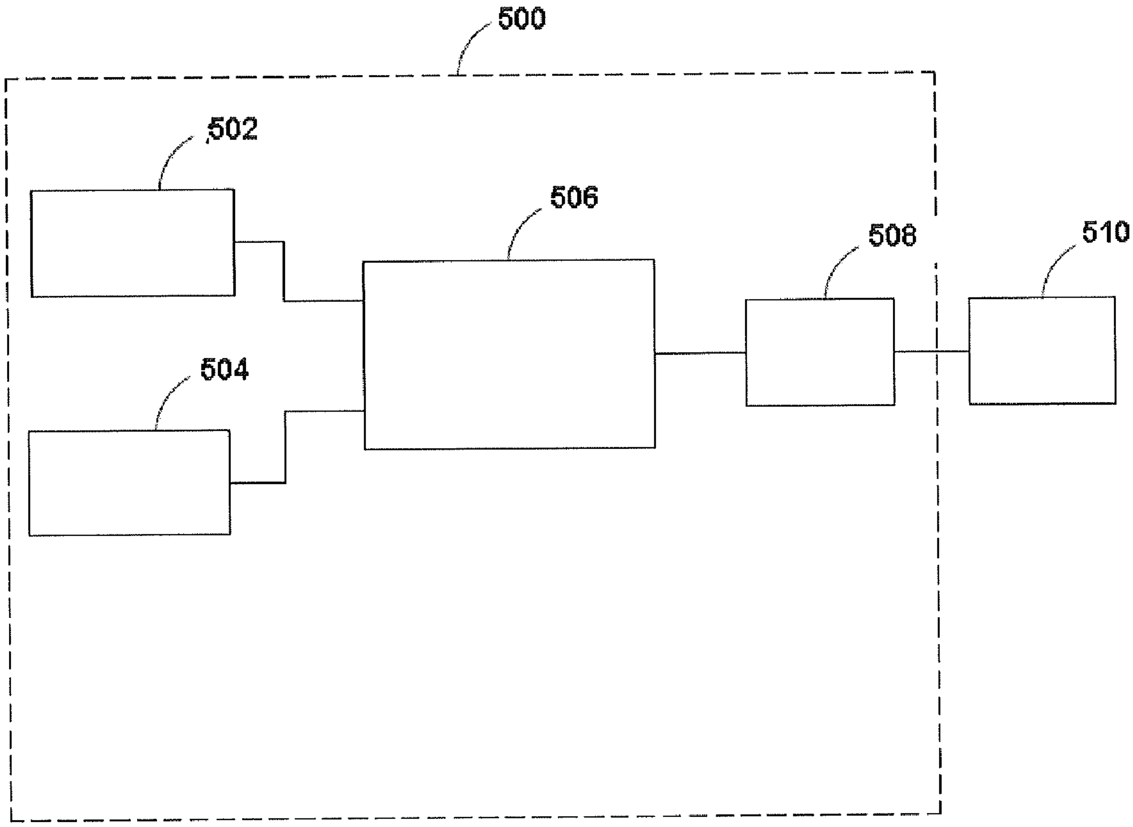
FIG. 5 describes a block diagram representation of a system for overlaying videos on a display device in accordance with an embodiment of the present disclosure.

FIG. 5 illustrates a block diagram representation of a system 500 for overlaying videos on a display device. The system 500 includes a first input module 502, a second input module 504, a blitting module 506 and an output module 508. The system 500 further includes a display device 510. The first input module 502 provides a first video while the second input module 504 provides a second video. The blitting module 506 is coupled to the first input module 502 and the second input module 504 for blitting the first and second video to generate the output blitted video stored in the output module 508. The blitting module 506 is enabled to function on hardware as well as software. The display device 510 is coupled to the output module 508 for displaying the blitted video.

In an embodiment of the present disclosure, the first input module 502 includes a first buffer. The second input module 504 includes another buffer. The output module 508 includes an output buffer and is a replica of the first input module 502.

The five blending modes described are achieved on configuration of the blitting module 506. The Blitting module 506 is required to support the transparency or blitting of the desired mode. For e.g. for Source color key transparency, the blitting module should support source color transparency. However in case of Destination Rectangle based blitting, a clip list provided by the OS or application is used. The clip list provides a set of clipping rectangles which define the area with the destination in which overlay buffer is to be displayed.

Figure 6:
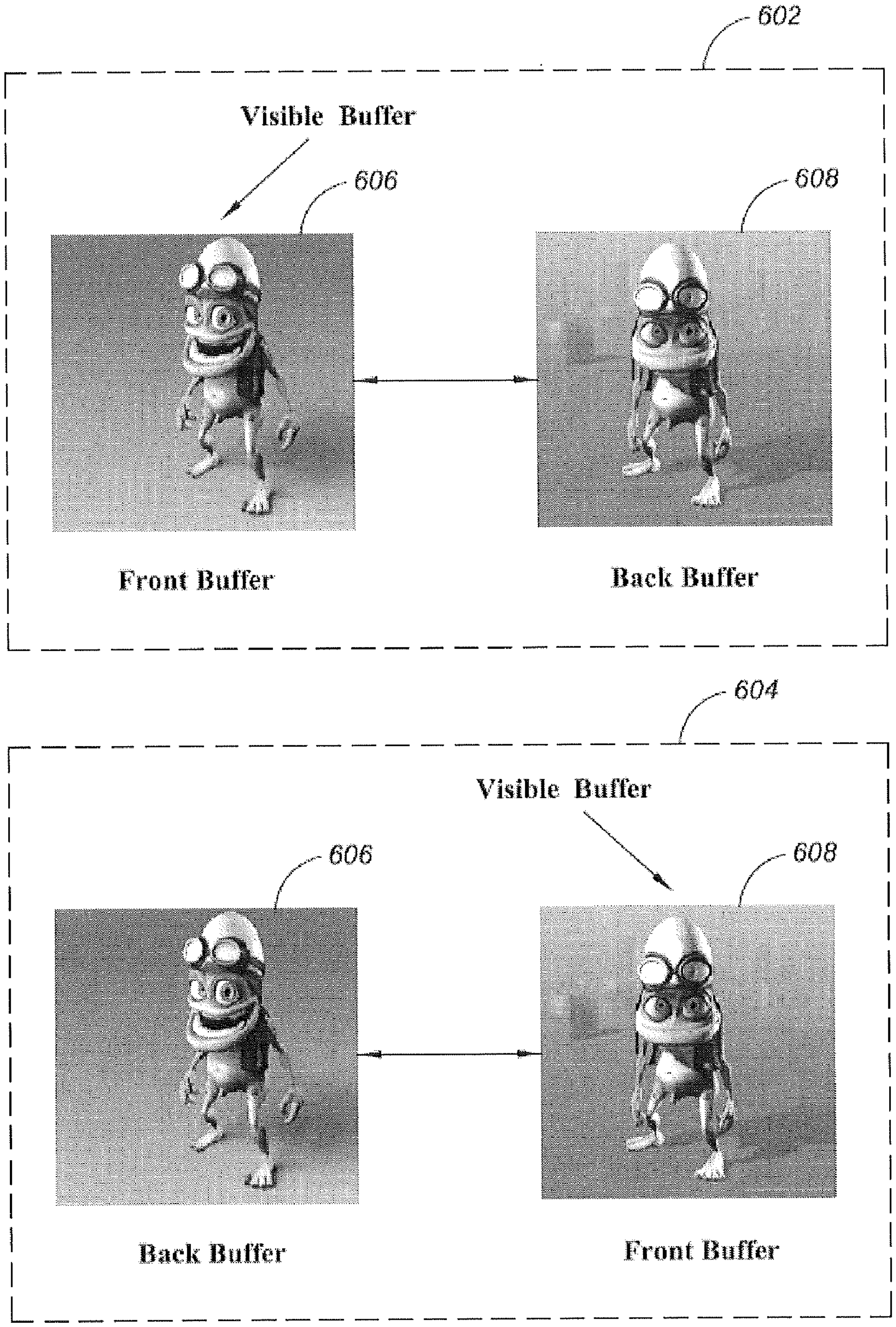
FIG. 6 illustrates a flipping process according to an embodiment of the present disclosure.
Figure 7:
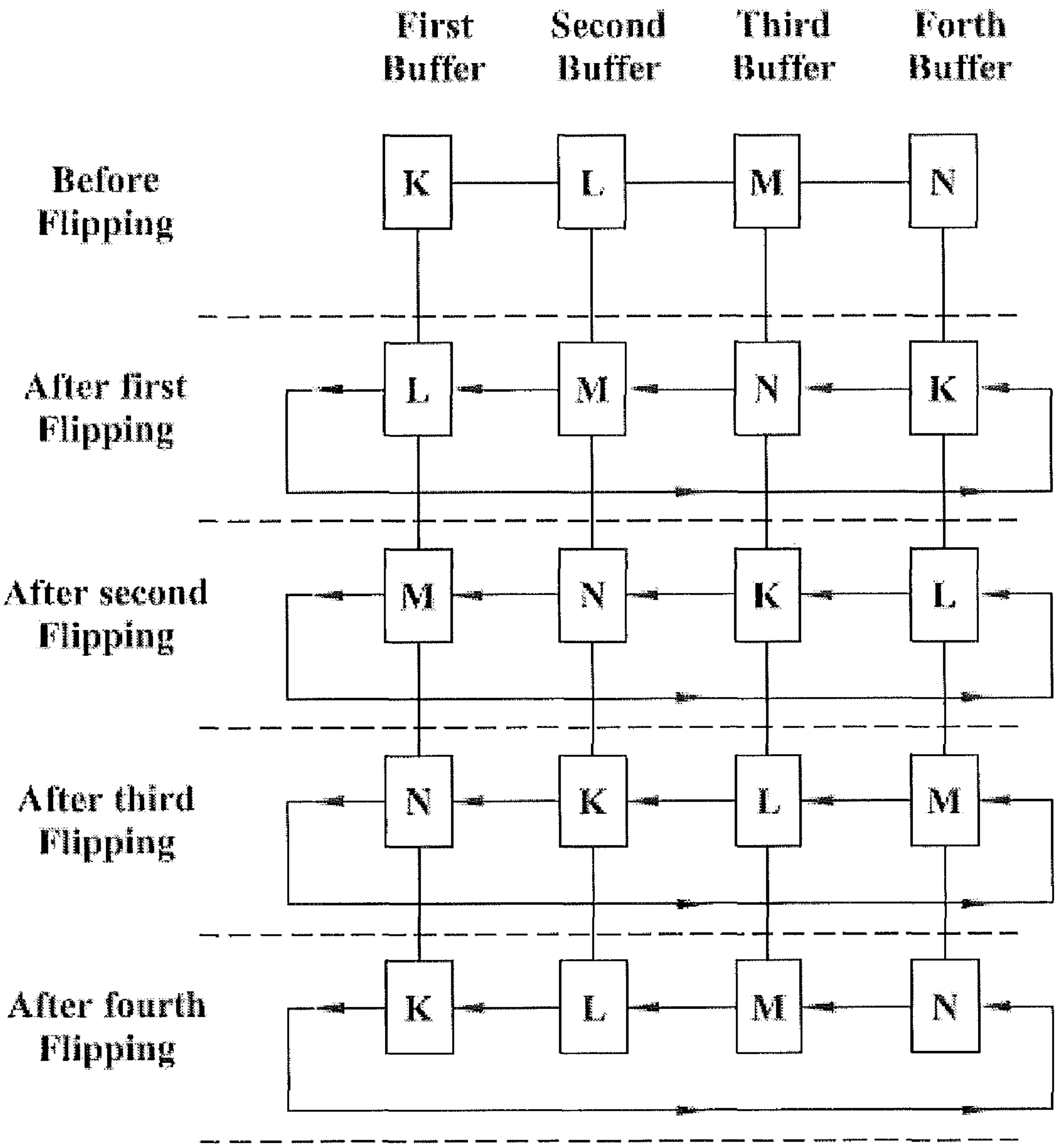
FIG. 7 illustrates a flipping process according to another embodiment of the present disclosure.

The various embodiments of the present disclosure such as that described in FIG. 5 can also work with the process of flipping. A flipping process is a process in which the buffer pointer is swapped between the front buffer and one or more back buffers. This construct of front buffer and one or more back buffers is commonly known as a flipping chain. As the request for flip operation is received, the pointers to surface memory for the front buffer and back buffers are swapped. Hence flipping is performed by switching pointers that the display device uses for referencing memory, not by copying surface memory. FIG. 6 illustrates that the pointer to the visible buffer is changed to another buffer without any memory copy. The visible buffer is a buffer 606 before flipping as shown in 602 and the visible buffer changes to a buffer 608 after flipping as shown in 604. When the flipping chain includes a first buffer and more than one back buffer, the pointers are switched in a circular pattern, as illustrated FIG. 7. The flipping process is very useful if the rate at which the data is filled in the buffer is less as compared to the refresh rate of the display. This gives a buffer in which the data can be filled in. When the buffer is fully updated the data is made visible by flipping the back buffer with the first buffer. The Flipping chain can be used for updating buffers for animations, graphics and videos. It is not necessary that the Flipping chain be used for Frame Buffers only. It can be used for off screen surface like overlay surface as well.

Further we should define color transparency. One color entry in a bitmap pattern of a source buffer or destination buffer is defined as “transparent” rather than an actual color. This indicates that when a blitting module encounters a pixel with this value, special handling is done by it. This handling depends upon the fact whether transparency exists in a source buffer or a destination buffer. Transparent blitting creates an illusion of nonrectangular blitting bitmap patterns, although the bitmaps are rectangular. There are basically two types of the transparency, one is a source color key transparency and another is a destination color key transparency.

Figure 8:
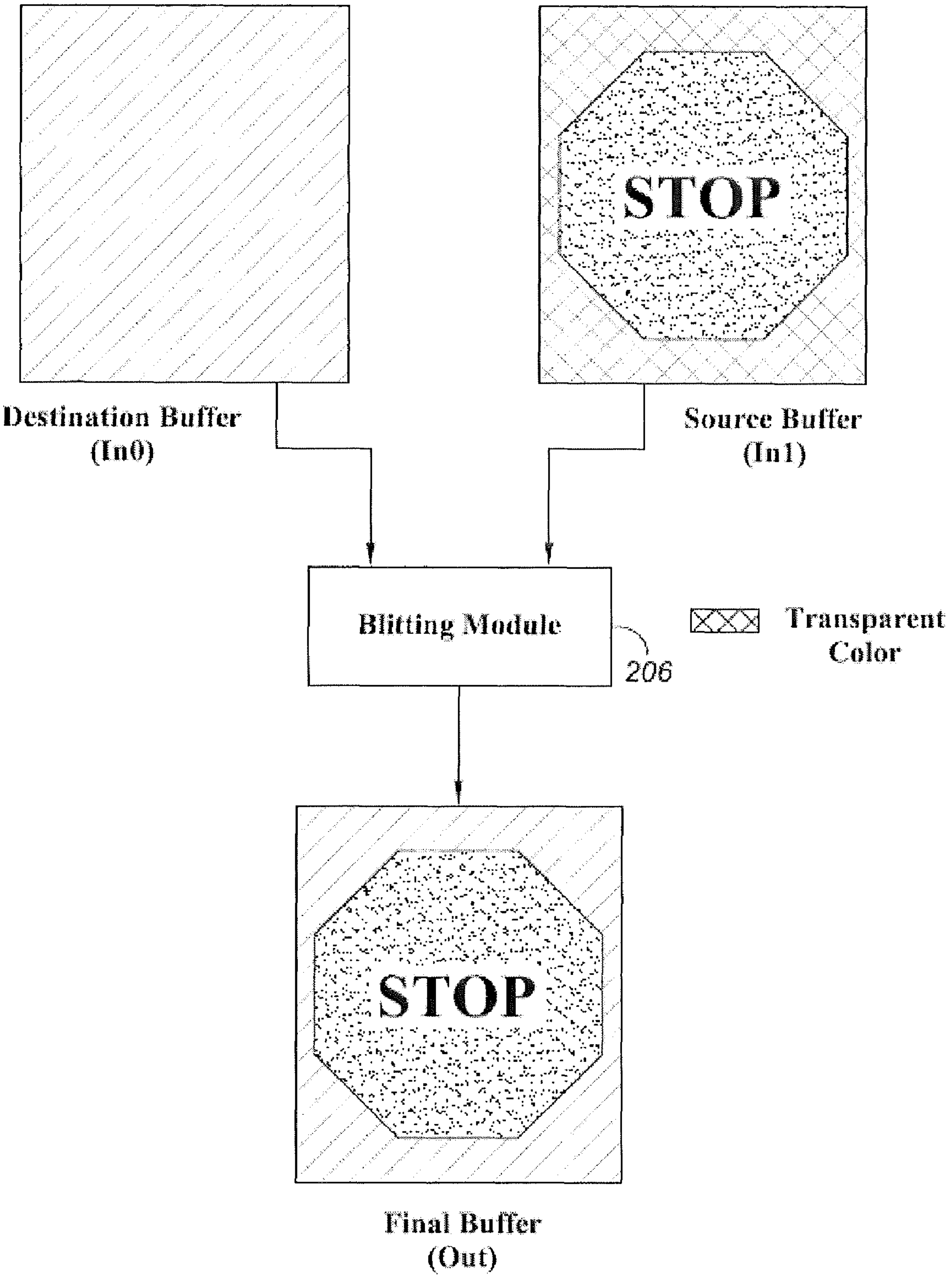
FIG. 8 shows transparent blitting with Source Color Key Transparency according to another embodiment of the present disclosure.

FIG. 8 illustrates transparent blitting with Source Color Key Transparency according to another embodiment of the present disclosure. A source pattern, which is to be blitted, is generally nonrectangular, but blits are always rectangular. Thus, each pixel within the source bitmap’s bounding rectangle becomes part of the data transfer. In source color transparent blitting, each pixel that is not part of the source pattern is treated as transparent when the blitting module 206 is moving the image to its destination. This ensures that it does not overwrite this color in the corresponding pixel on the destination buffer. Normally an arbitrary color or a range of colors is used as the transparency color key. Hence, this type of color key is known as a source color key.

Figure 9:
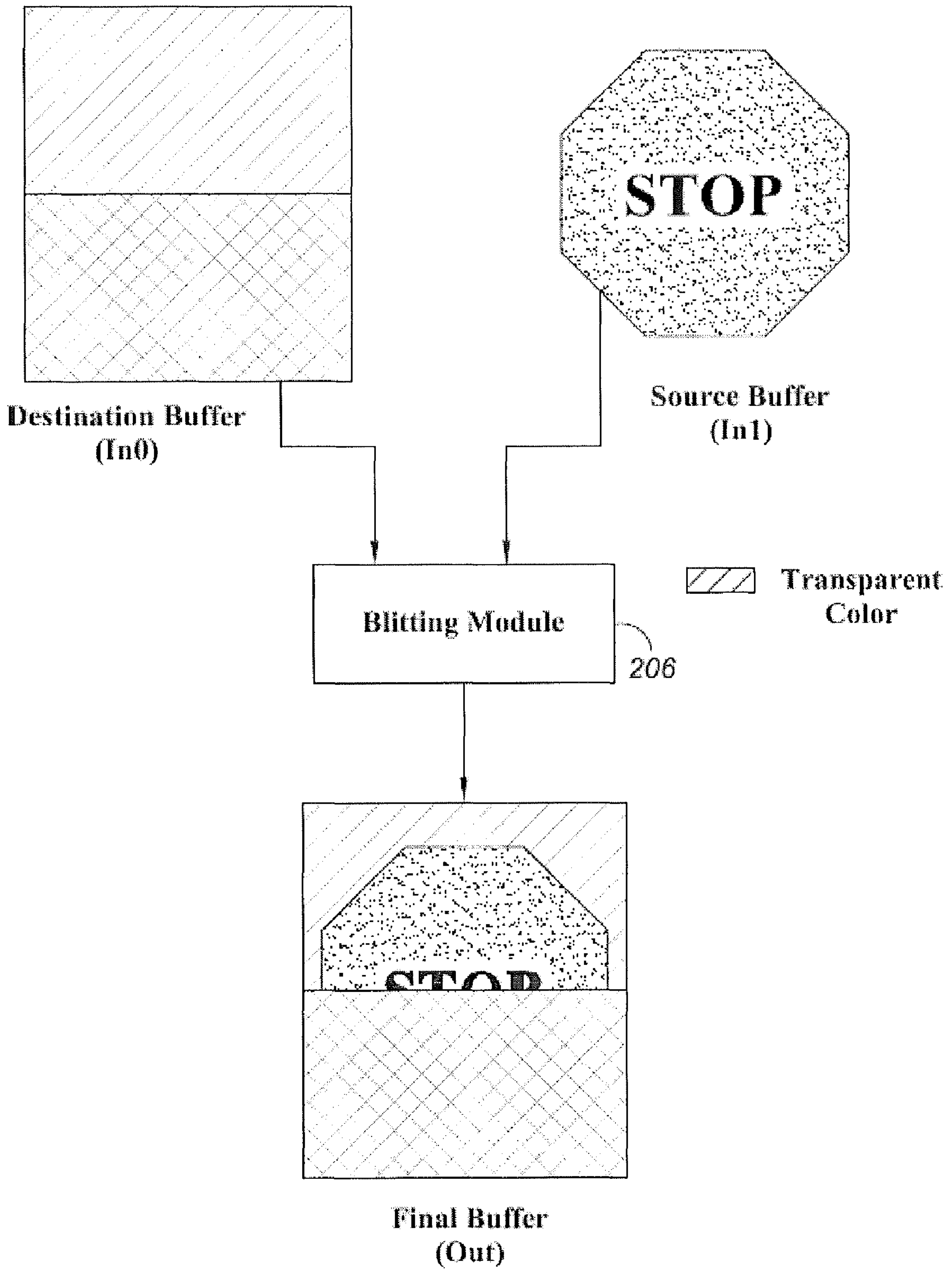
FIG. 9 describes transparent blitting with Destination Color Key transparency according to an embodiment of the present disclosure.

FIG. 9 illustrates transparent blitting with the destination color key transparency according to another embodiment of the present invention. A destination color key refers to pixels in the destination buffer which can be overwritten by a source image. Once the destination color key is set for the destination buffer, the blitting module 206 blits the source buffer to only those part of the destination buffer that are same as the destination color key.

Figure 10:
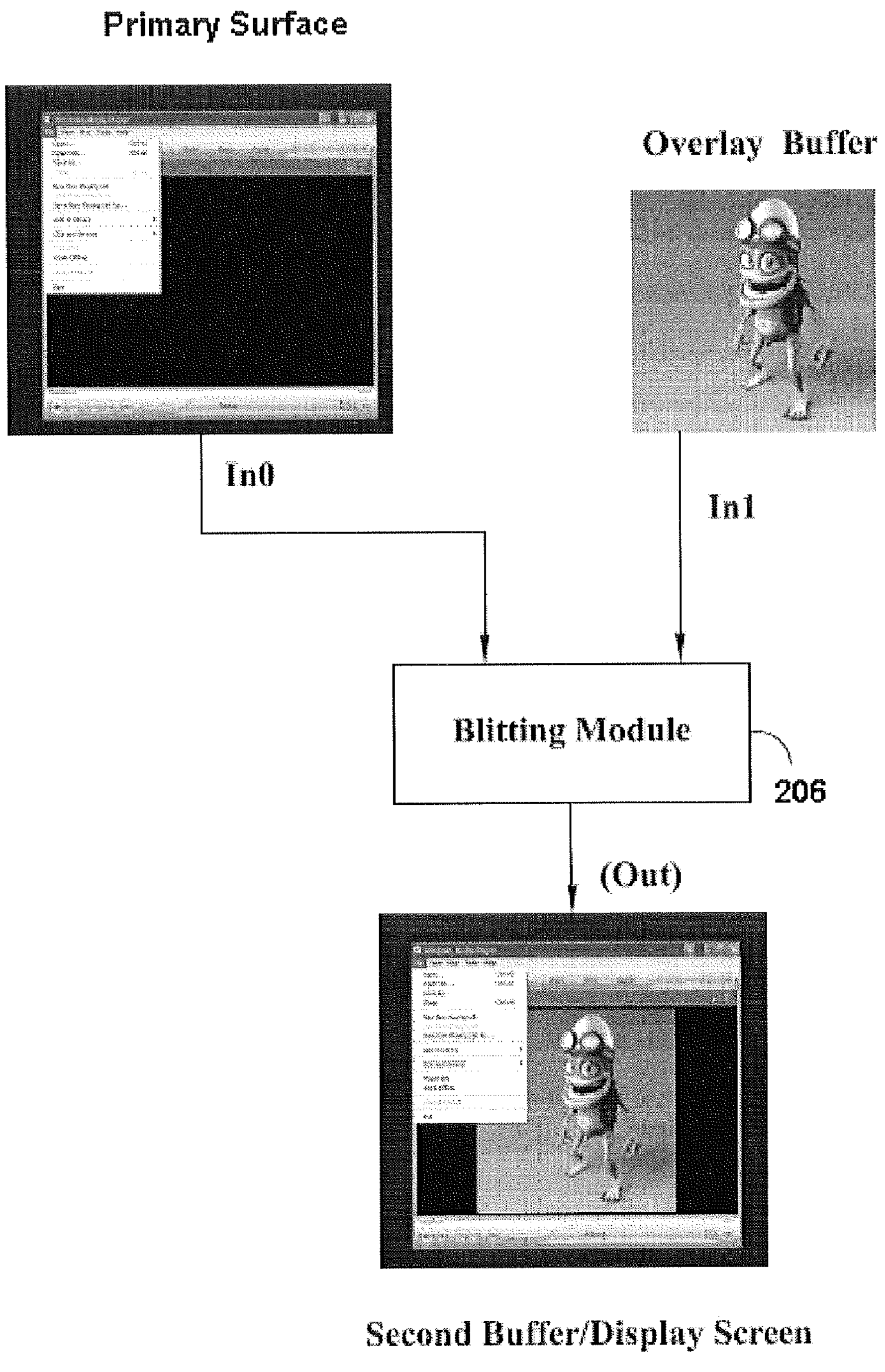
FIG. 10 shows a diagrammatic representation of a system for overlaying videos using Source Color Key Transparency in accordance with an embodiment of the present disclosure.

FIG. 10 shows a diagrammatic representation of a system for overlaying videos using Source Color Key Transparency or no transparency in accordance with an embodiment of the present disclosure. A copy of the first/primary/frame buffer is made on receiving a request signal for overlay activation. This copy (referred to as Copy Buffer hereafter) is then configured as the second/frame buffer. Note that initially, the first buffer was both the primary buffer and the frame buffer. But on Overlay request, the primary Buffer and Frame buffer become different buffers. Now the first buffer called the Primary Buffer is the buffer on which application performs updates/graphics operation. The second Buffer is now the Frame Buffer, which is displayed on screen. The blitting module 206 is configured with two source buffers: the first/Primary buffer with a configurable source color key transparency and the overlay buffer. In case Source Color Key is desired, the blitting module 206 is configured for the first/Primary buffer with the source color key transparency active. If Source Color Key is not desired, the blitting module 206 is simply configured for the first/Primary buffer without any transparent color. The second/Frame buffer is configured as an output buffer (out) and its data is displayed on the display screen. For each update of Overlay buffer or Primary Surface, the blitting module 206 is configured for overlay simulation by blitting the overlay buffer and the Primary buffer on the frame buffer, with optional configuration of source color key transparency on the Primary buffer.

The timing of blitting of the overlay buffer on the second buffer is configured in any of the three ways. Firstly, if operating system supports flipping, blitting is performed each time a flip of overlay buffer call is received. Secondly, depending upon the frame updation rate of video/game/application or some timer value, blitting is performed periodically. The third technique is to simply perform the frame buffer update continuously.

Once a request for overlay deactivation is received, the copy buffer which is temporarily configured as the Frame Buffer is reset.

Figure 11A:
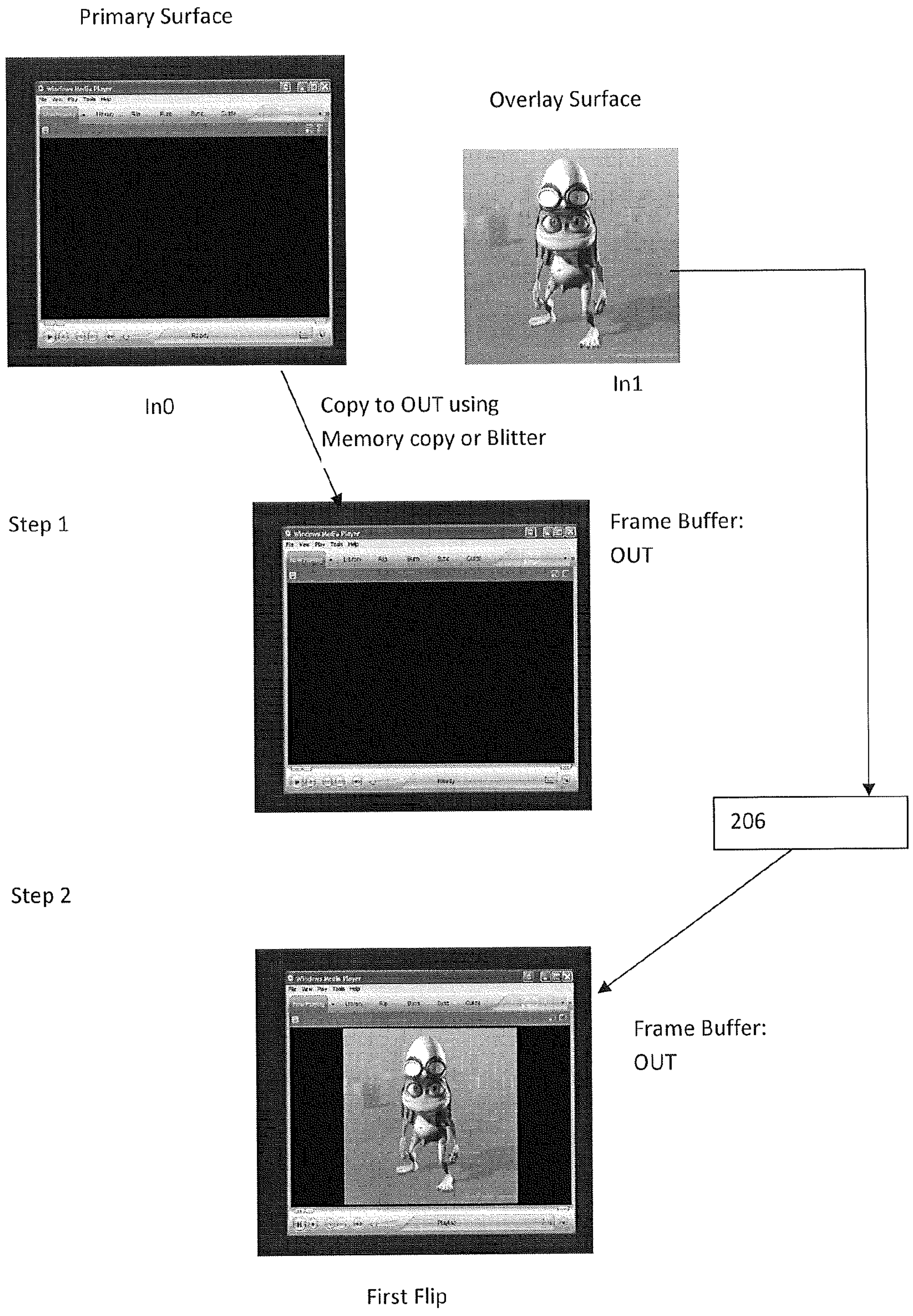
FIG. 11(*a*) illustrates a diagrammatic representation of a system for overlaying videos using Destination Color Key Transparency according to an embodiment of the present disclosure.
Figure 11B:
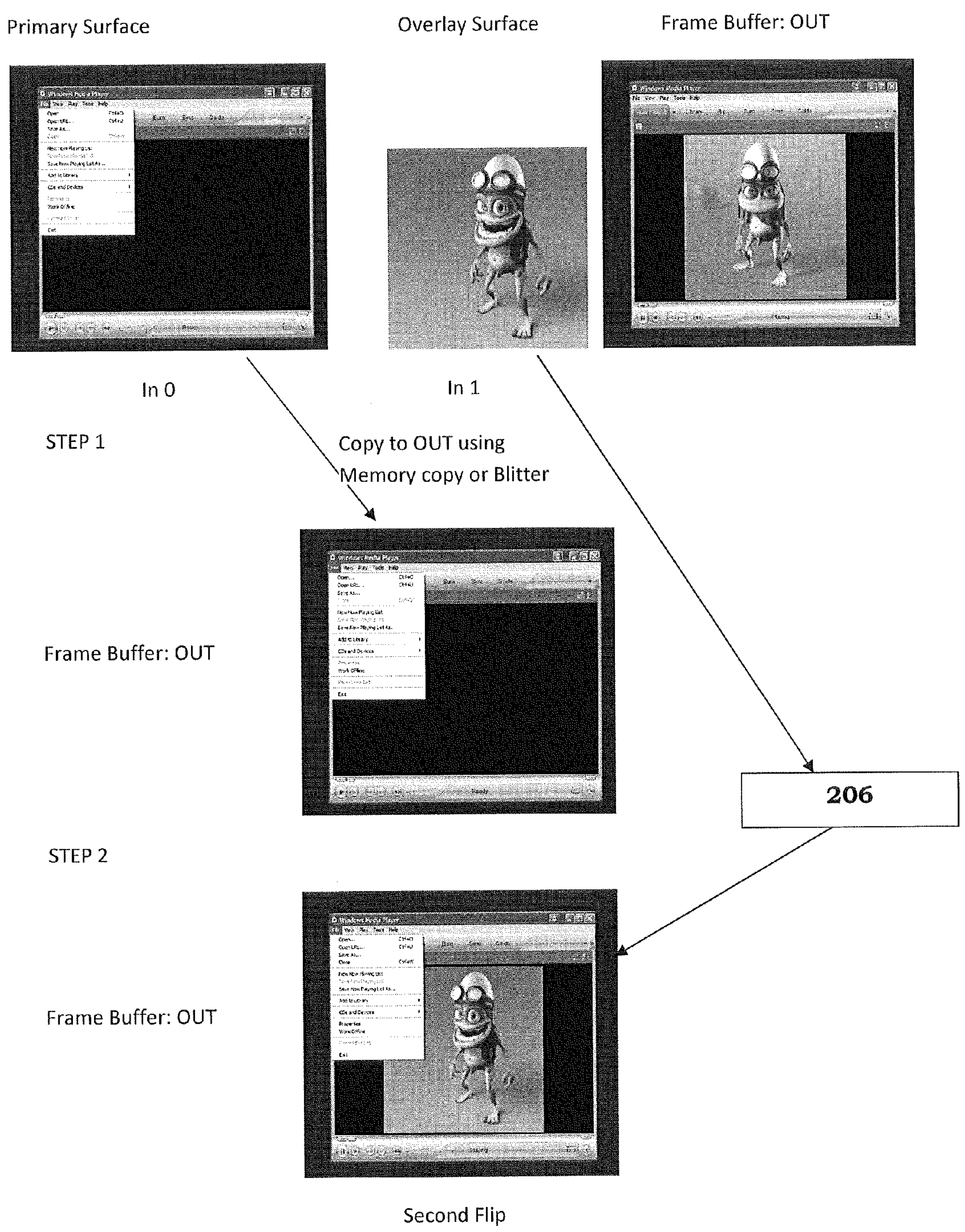

FIGS. 11(*a*) and 11(*b*) describe a diagrammatic representation of for overlaying videos on a display device using Destination Color transparency according to embodiments of the present disclosure.

When a request for overlay activation is received, a copy of the Primary buffer is made and the copied buffer is configured as the Frame buffer. The Primary Buffer stores primary data such as background of a video or an image. The blitting module 206 is configured with overlay buffer as the source buffer.

For each frame update required, firstly the Primary buffer is copied to the Frame Buffer using any memory copy software routine or using blitting module. Secondly, blitting is performed with the overlay buffer as input buffer and the Frame Buffer as output buffer. The overlay buffer stores overlay data which is to be overlaid on the primary data to generate an overlaid video.

When a request for overlay deactivation is received, the Primary buffer is reconfigured as the Frame buffer and then the copied OUT buffer is reset.

Figure 12A:
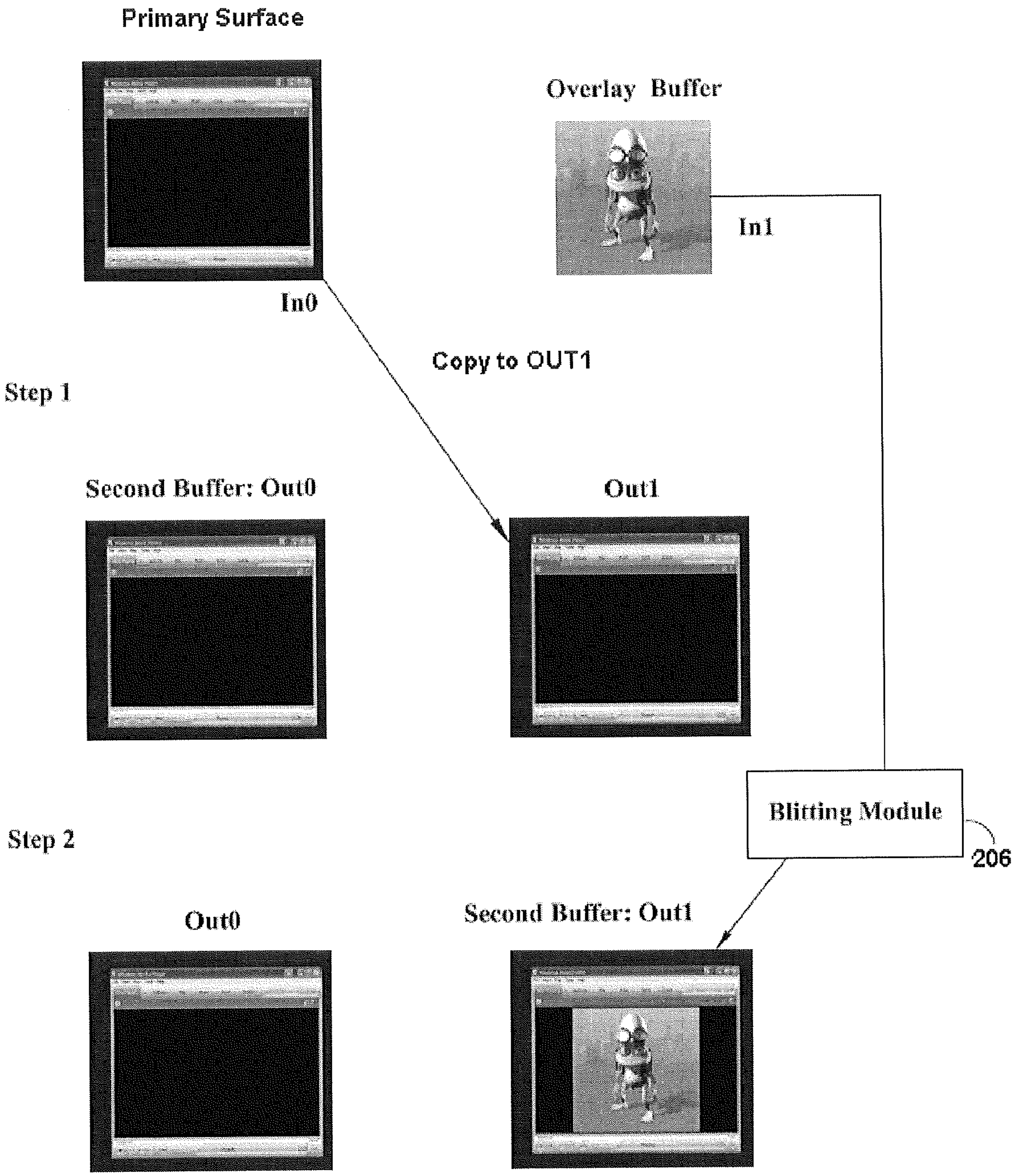
FIG. 12(*a*) describes a diagrammatic representation of a system for overlaying videos using Destination Color Key Transparency according to an embodiment of the present disclosure.
Figure 12B:
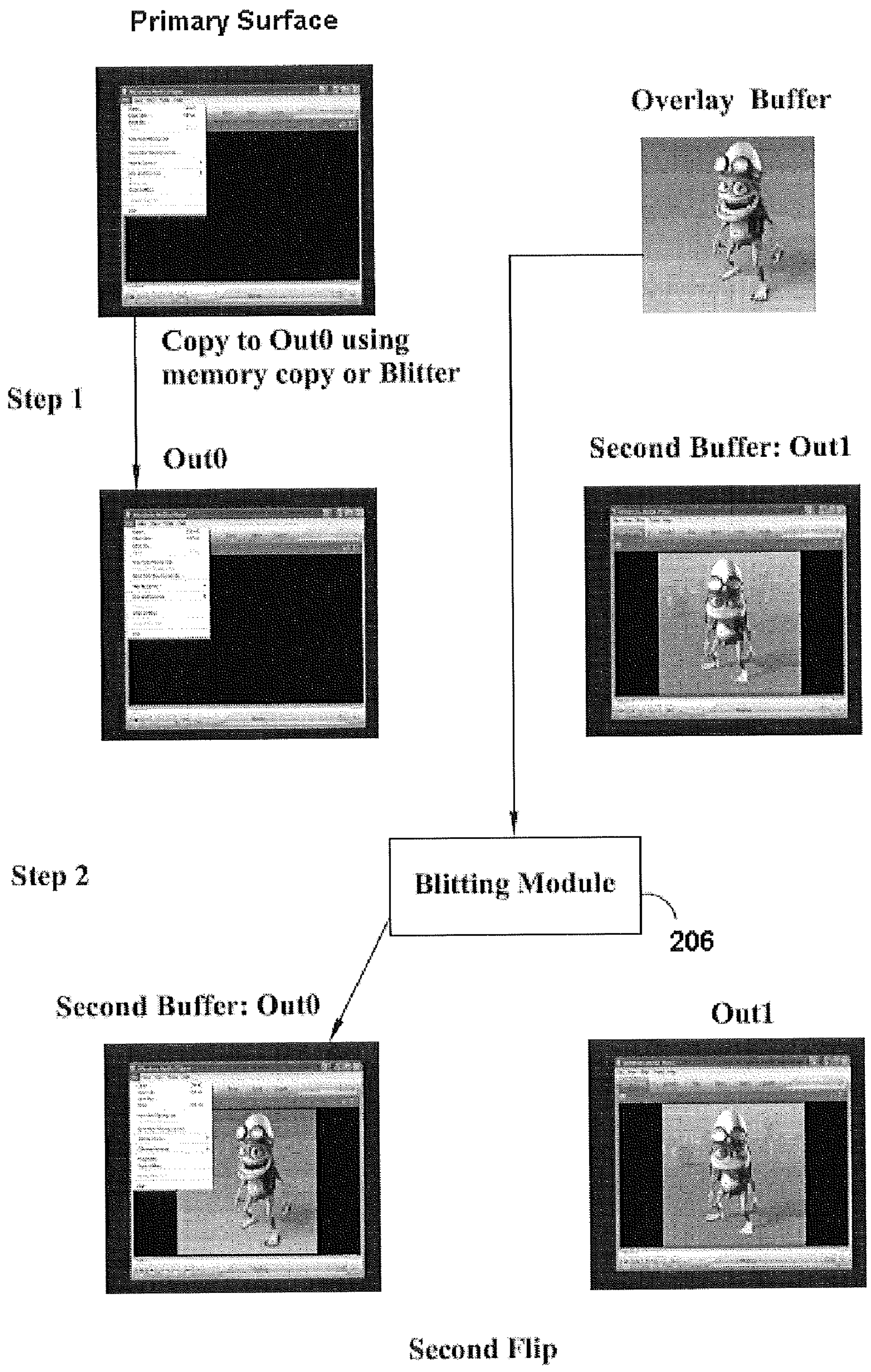

There are possibilities that the current Frame Buffer content is drastically different from the Primary Surface content. In such a case in the First Step of Image Update, when the Primary Buffer is copied to the Frame Buffer, the tearing effect is easily visible to the user. Therefore, two copies of Primary Surface i.e. OUT0 and OUT1 are made and each one of them is alternately configured as the Frame Buffer. FIG. 12(*a*) and 12(*b*) illustrates the above mentioned embodiment of the present disclosure.

When a request for overlay activation is received, two copies of the first/primary/frame buffer Out0 and Out1 are made. The two copy buffers (Out0 and Out1) are configured as the second/frame buffer alternatively, at each overlay update. Initially, the Out0 buffer can be configured as the current second/frame buffer. The blitting module 206 is configured with overlay buffer as the source buffer.

For each Frame buffer update required, firstly the Primary Surface is copied to the second buffer using memory copy routine or blitting. The second buffer is one of the copy buffers out0 or out1 buffer and is the buffer different from the current Frame Buffer. Secondly, blitting is performed by configuring the blitting module 206 with the overlay buffer as input and the current second buffer as output buffer with destination color transparency. Thirdly, the second buffer is set as the current frame buffer.

Hence, blitting is performed twice (or one blitting and one memory copy) per updation of the Frame Buffer.

When a request for overlay deactivation is received, the first/Primary buffer is reconfigured as the Frame buffer and the output buffers (Out0 and Out1) are reset.

The timing of Frame Buffer update can be set in one of the following 3 ways: Firstly, if operating system supports flipping, blitting is performed each time a flip of overlay buffer call is received. Secondly, depending upon the frame updation rate of video/game/application or some timer value, blitting is performed periodically. The third technique is to simply perform the frame buffer update continuously.

Figure 13:
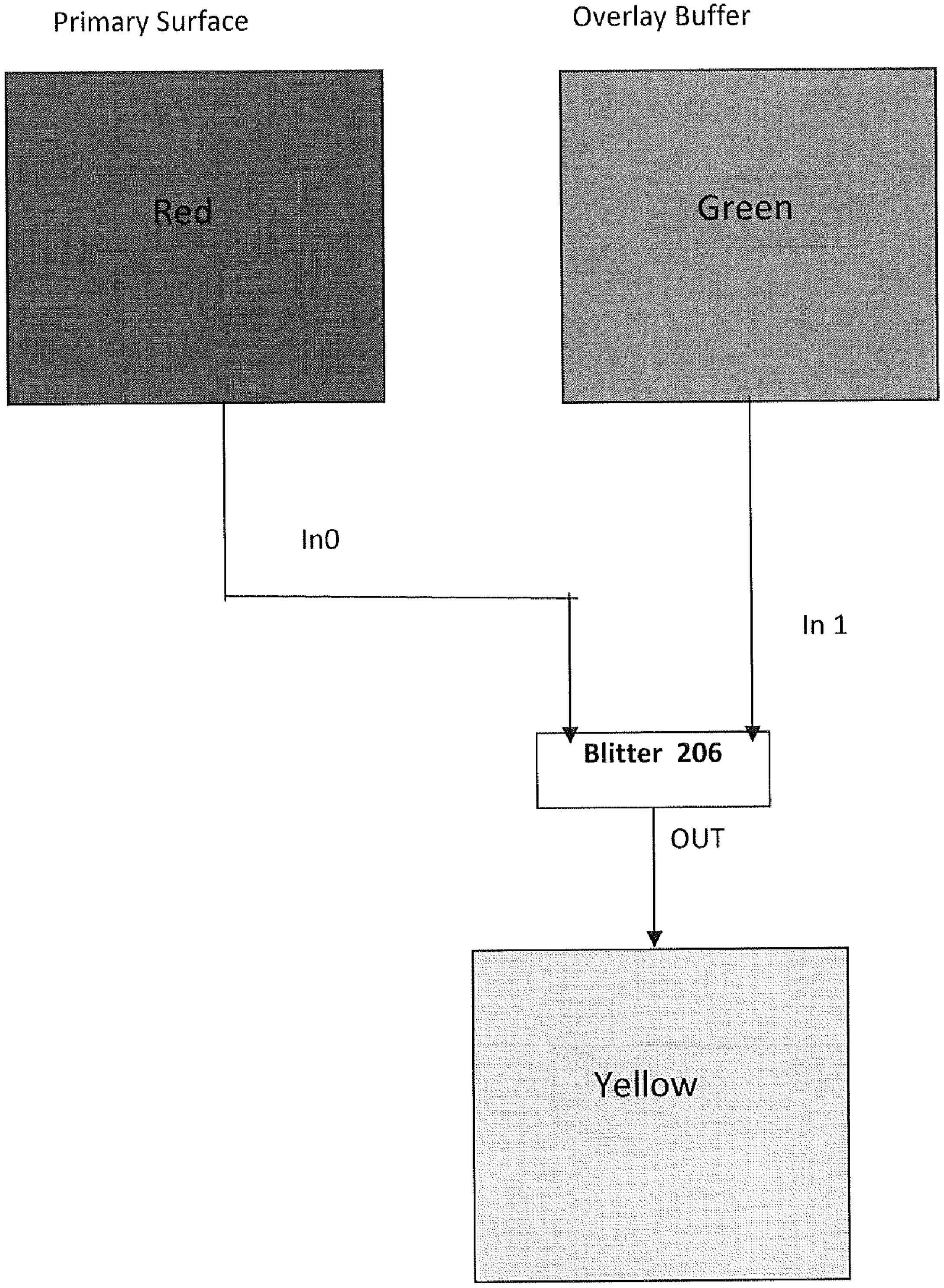
FIG. 13 illustrates a diagrammatic representation of a system for overlaying videos using ROP(Raster operation: OR) based blitting according to another embodiment of the present disclosure.

In yet another embodiment of the present invention illustrated in FIG. 13, the System uses raster operation (ROP). A copy of the first buffer is made on receiving a request signal for overlay activation and the copied buffer is configured as the Frame buffer. The first frame is a frame on which application performs updates/graphics operation. The blitting module 206 is configured with two input buffers: Primary buffer and Overlay Buffer. The frame buffer is configured as the output buffer of blitting module 206. The blitting module 206 is configured for overlay simulation performed with appropriate raster operation (ROP) on the first buffer and the overlay buffer with the output on the Frame buffer.

The timing of blitting of the overlay buffer on the second buffer is configured in any of the three ways:

Firstly, if the system supports flipping, blitting based on the raster operation is performed each time a flip of overlay buffer call is received.

Secondly, depending upon the frame updation rate of video/game/application or some timer value, blitting is performed periodically.

Thirdly, the operation of combining the first frame buffer and the overlay buffer based on the appropriate raster operation (ROP) can be performed continuously.

Once a request for overlay deactivation is received, the copy buffer, which was temporarily configured as the Frame Buffer, is reset.

Figure 14:
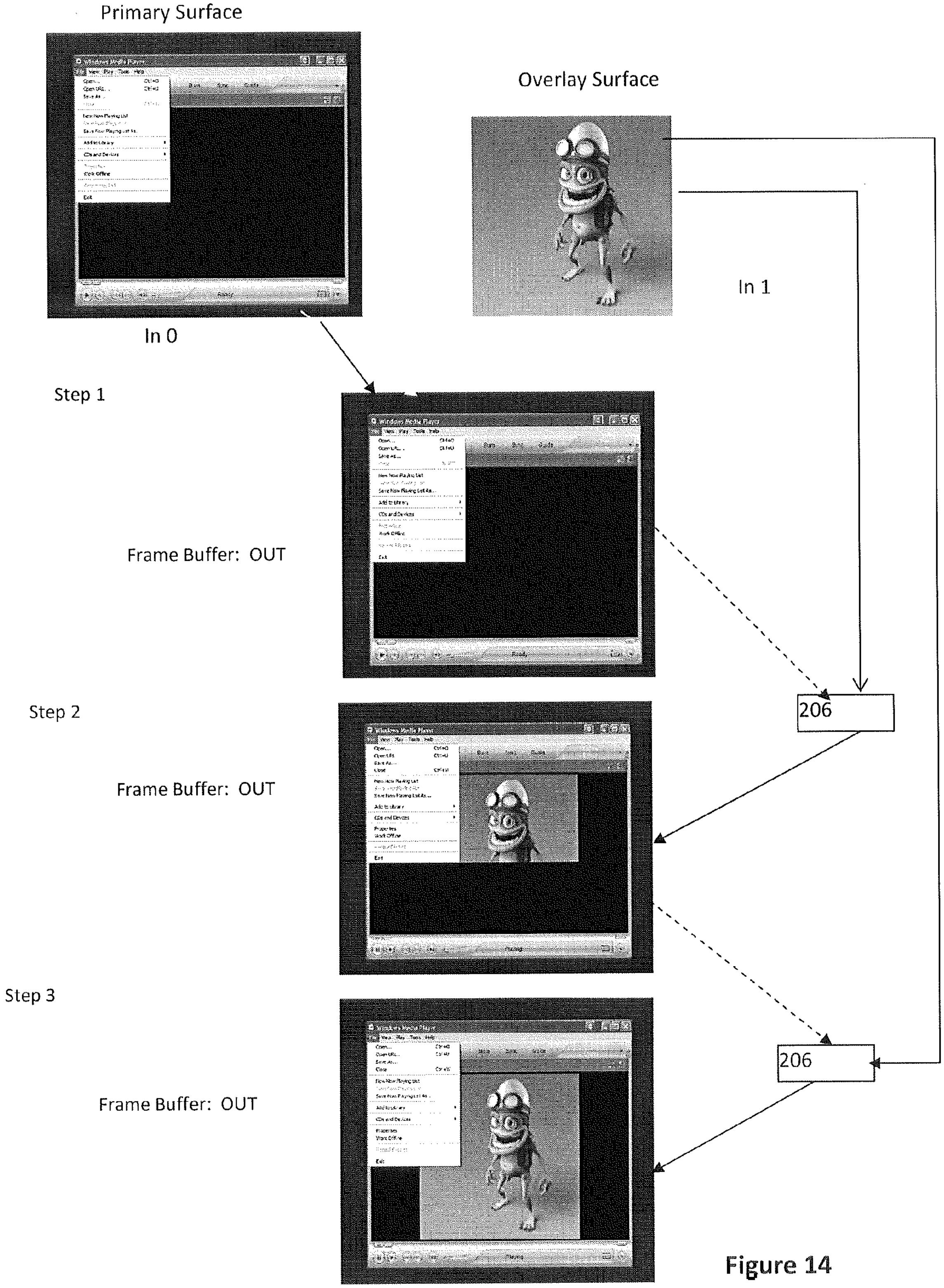
FIG. 14 illustrates a diagrammatic representation of a system for overlaying videos using Destination Blitting Rectangles in accordance with an embodiment of the present disclosure.

FIG. 14 illustrates a diagrammatic representation of a system for overlaying videos using Destination Blitting Rectangles in accordance with an embodiment of the present disclosure. A copy of the first/primary/frame buffer is made on receiving a request signal for overlay activation. The copied buffer is then configured as the frame buffer. For each Frame Buffer Update required, a Clip List is provided by the OS or Application. The clipping rectangles in the clip list define the portion of the overlay buffer to be blitted on the Frame buffer. The Frame Buffer Update requires 2 steps:

Firstly, the first/Primary buffer is copied to the Frame Buffer. Copying is done using any memory copy software routine or by using blitting module 206.

Secondly, for each clip rectangle in the Clip list, blitting is performed by configuring the blitting module 206 with the overlay buffer as input and the Frame Buffer as output buffer.

Hence, the methodology may need '1+number of Destination Rectangle Clips in Clip List' number of blittings per frame buffer update or memory copy+'number of Destination Rectangle Clips in Clip List' number of blittings per frame buffer update.

Once a request for overlay deactivation is received, the copy buffer which is temporarily configured as the Frame Buffer is reset.

The timing of blitting of the overlay buffer on the second buffer is configured in any of the three ways. Firstly, if operating system supports flipping, blitting is performed each time a flip of overlay buffer call is received. Secondly, depending upon the frame updation rate of video/game/application or some timer value, blitting is performed periodically. The third technique is to simply perform the frame buffer update continuously.

As illustrated by embodiments mentioned in FIG. 12(*a*) and 12(*b*) to ensure effective overlaying without tearing effect, two copies of Primary Buffer OUT0 and OUT1 are made and each one of them is configured alternately as the Frame Buffer and the non Frame buffer is the buffer to receive the output of Blitting module 206.

Figure 15:
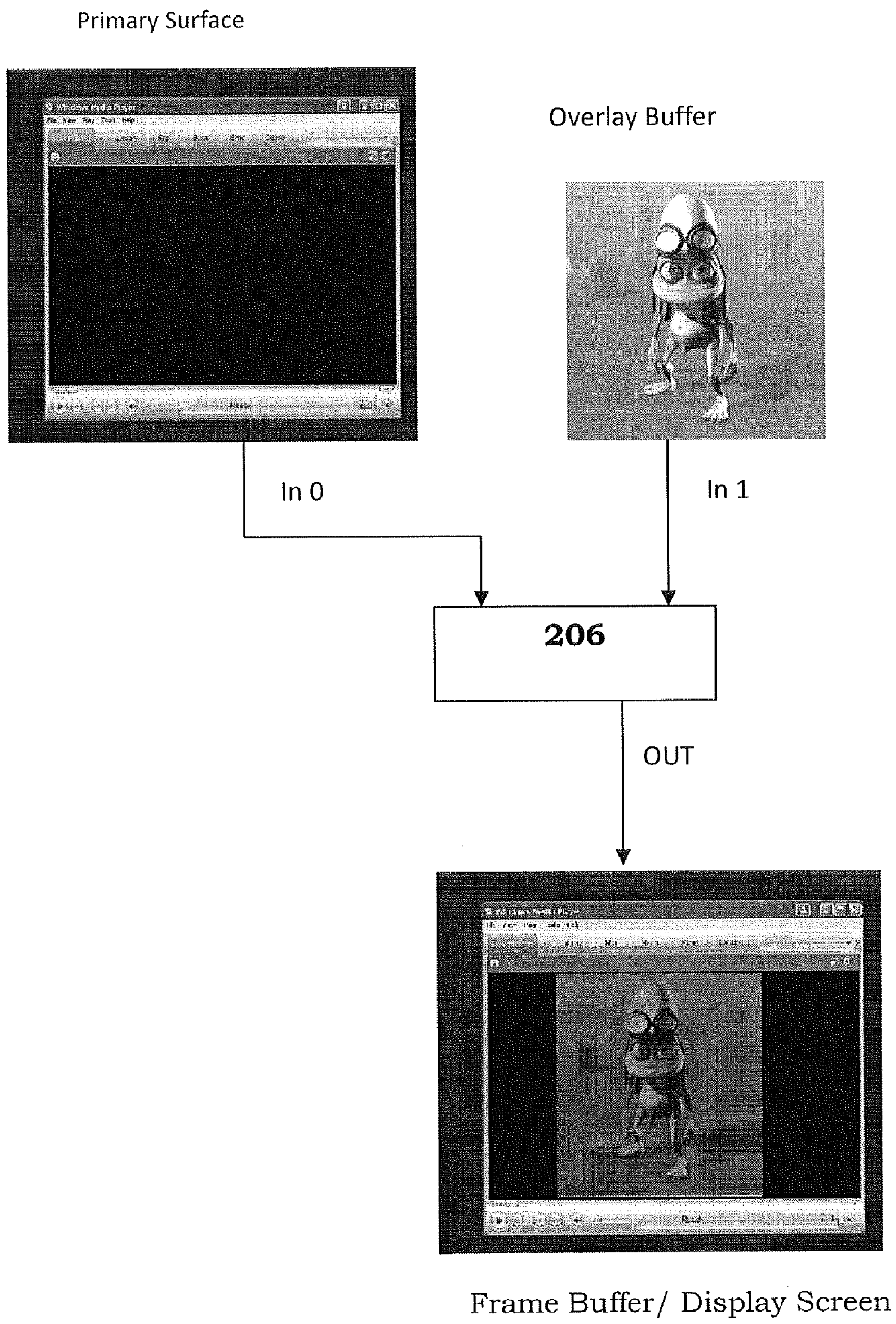
FIG. 15 shows a diagrammatic representation of a system for overlaying videos using Alpha Blending (with Surface Constant $\alpha$ as 0.5) in accordance with an embodiment of the present disclosure.

In yet another embodiment of the present disclosure, a system for overlaying videos using alpha blending is illustrated (refer FIG. 15). A copy of the first/primary/frame buffer is made on receiving a request signal for overlay activation. The copied buffer is then configured as the frame buffer.

The blitting module 206 is configured with two source buffers: the first/Primary buffer and the overlay buffer.

For Alpha Blending method either, Full Surface Constant Alpha method or per-pixel Alpha method can be used. FIG. 15 shows a diagrammatic representation of a system for overlaying videos using Alpha Blending with Surface Constant $\alpha$ as 0.5

If an Alpha Channel is associated with the pixels of Overlay Buffer, per pixel Alpha method is used (though Surface Constant Alpha method can also be used). For per pixel Alpha method, the Overlay buffer should support ARGB pixel format, where A is the alpha or transparency component of the pixel and RGB stands for Red Green Blue. Alpha channel is 1 bit, 2 bit, - - - or n bit In the present embodiment, an Alpha as is associated with each pixel of Overlay buffer, so that the color component $c_D'$ of the destination is approximated as:

$$c_D'=c_S+(1-\alpha_S)*c_D$$

where:

$c_D'$: Color Component of Destination/Frame Buffer $c_D$: Color Component of Primary/First Buffer $c_S$: Color Component of Overlay Buffer $\alpha_S$: Alpha for pixel of Overlay buffer However, if Alpha Channel also exists for the Frame Buffer, $\alpha_D'$ for the pixel of Frame Buffer is approximated as:

$$\alpha D'=\alpha_S+(1-\alpha_S)*\alpha_D$$

where $\alpha_D$: Alpha for pixel of Primary/First buffer $\alpha_D'$: Alpha for pixel of Frame buffer $\alpha_S$: Alpha for pixel of Overlay buffer If an alpha channel is not associated with the pixels of the Overlay and Primary/Frame Buffer, Full Surface Constant Alpha method is used. In such an embodiment, an Alpha $\alpha$ provided by OS or Application is associated with the Overlay Buffer, so that the color component $c_D'$ of the destination becomes:

$$c_D'=c_S+(1-\alpha)*c_D$$

where:

$c_D'$: Color Component of Destination/Frame Buffer $c_D$: Color Component of Primary/First Buffer $c_S$: Color Component of Overlay Buffer $\alpha$: Constant Alpha provided by OS/Application For each Frame buffer Update required, the blitting module 206 is programmed for overlay simulation by alpha blending the Overlay Buffer on the Primary buffer and getting the output on the Frame buffer.

The timing of Frame buffer update is decided in any three steps as described in the previously described embodiments.

In the FIGS. 10, 11(*a*), 11(*b*), 12(*a*), 12(*b*), 14 and 15, the Destination Rectangle for Overlay Buffer is a black screen inside player window in the Primary Buffer and not the whole Source Buffer.

Figure 16:
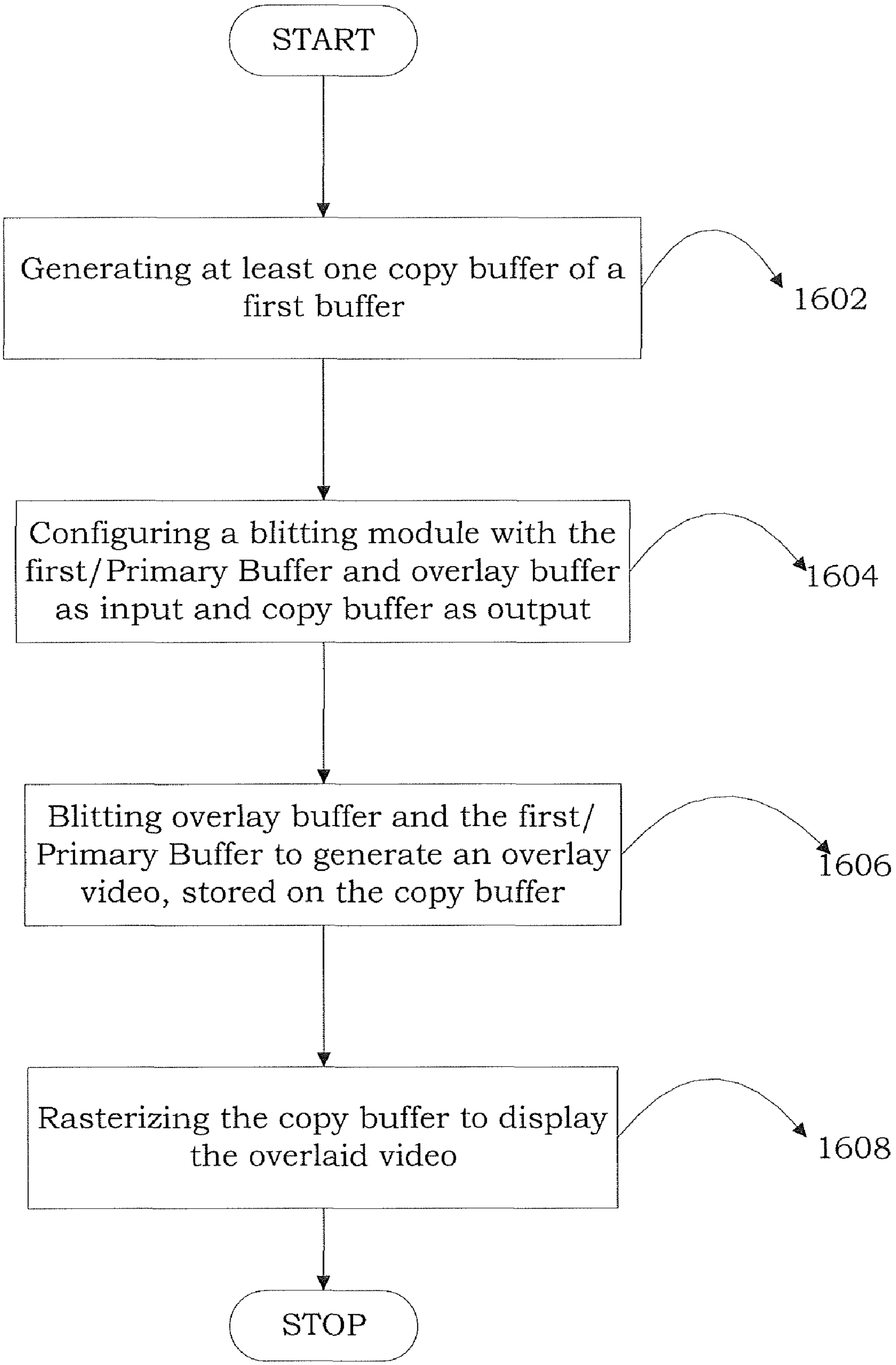
FIG. 16 shows a flow diagram representation of a method for overlaying videos in accordance with an embodiment of the present disclosure.

FIG. 16 illustrates a flow diagram representation of a method for overlaying videos on a display device according to an embodiment of the present invention. At step 1602, at least one copy buffer of a first buffer is generated. At step 1604, a blitting module 206 is configured with the first buffer and at least one overlay buffer as Inputs and copy buffer as output. At step 1606, the at least one overlay buffer is blitted onto the first buffer to generate an overlaid video which is stored in the copy buffer. At step 1608, the overlaid video in the copy buffer is rasterized to display.

Figure 17:
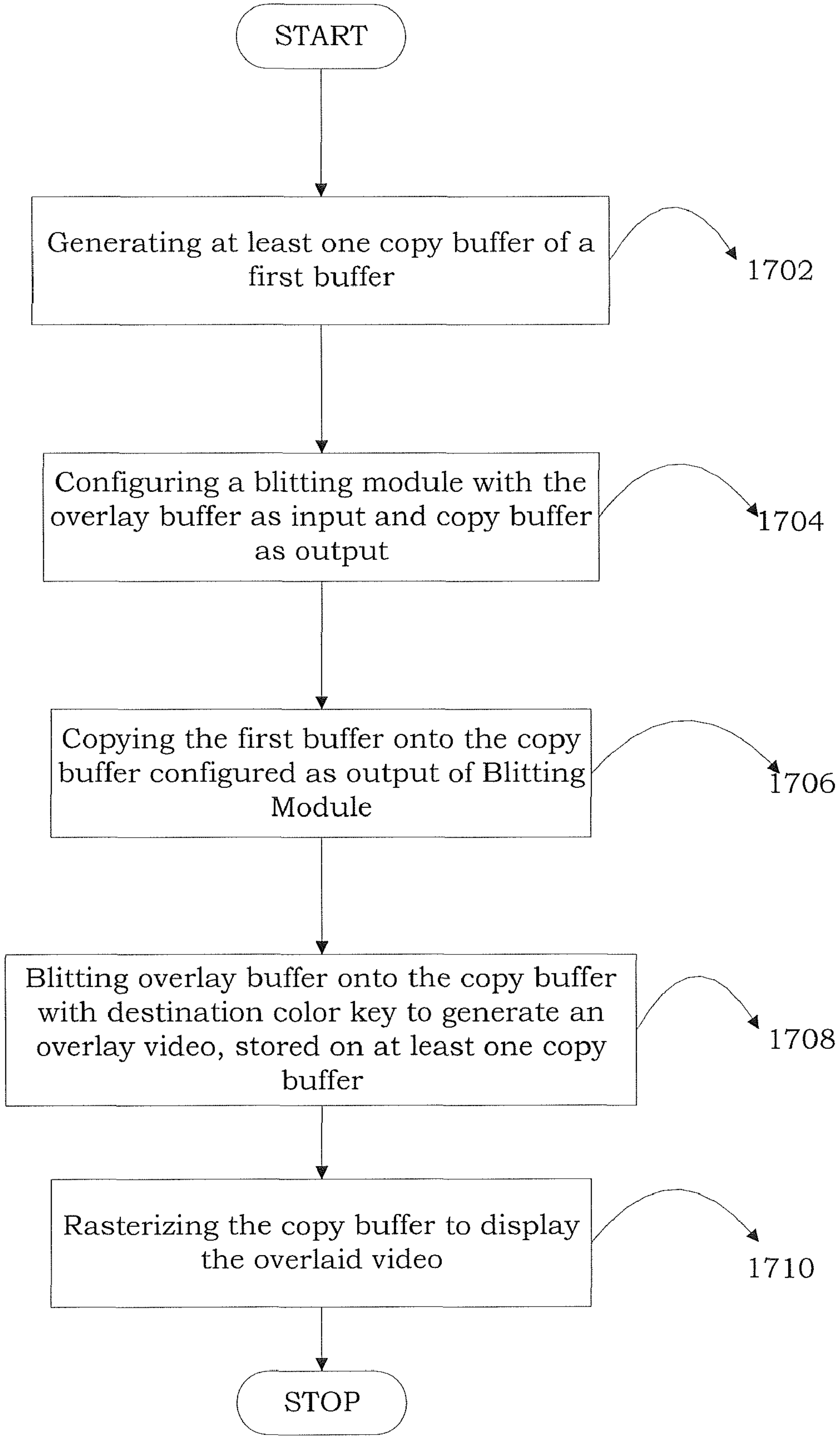
FIG. 17 illustrates a flow diagram representation of a method for overlaying videos based on Destination Color Key transparency in accordance with an embodiment of the present disclosure.

FIG. 17 illustrates a flow diagram representation of a method for overlaying videos on a display device according to another embodiment of the present invention based on Destination Color Key transparency. At step 1702, at least one copy buffer of a first buffer is generated. At step 1704, a blitting module 206 is configured with at least one overlay buffer as source buffer and a copy buffer as the output buffer. At step 1706, the first buffer is copied onto the copy buffer which is currently at the output buffer of blitting module 206. At step 1708, overlay buffer is blitted onto the copy buffer to generate an overlaid video using a destination color transparency. At step 1710, the overlaid video from copy buffer is rasterized.

Also in all the embodiments mentioned above, it is not necessary that the size of destination blitting rectangle be always same as the size of input source overlay buffer i.e. the invention allows stretching/shrinking the overlay surface while blitting on the Destination.

The embodiments of the present disclosure, reduce hardware requirement and increase flexibility as it may be applied to different types of overlay methods such as a source color key transparency, a destination color key transparency, a clipping rectangle overlay, an alpha blending overlay and a raster operation (ROP) overlays.

The various embodiments of the present disclosure widen the range of applications targeted by the system in the absence of hardware overlay. As an example a system is an embedded system such as Smart phone/PC/TV. In present times of high end graphics demands by Computer/Mobiles/PDA's, Overlay is a primary feature required by many Games and Video Players. However, Overlays require support from hardware like Graphics Card. Therefore, if the Overlay support is not present in hardware, the present disclosure is used to simulate the Overlay feature so that it is not a bottleneck for Games and other user applications.

Also, overlays support increases the performance of some applications as the blitting capability of hardware is utilized by applications. Generally rectangular blitting feature is present in most of the 2d Graphics Card present on Computer/Mobile Phone/PDA. The embodiments of the present disclosure exploit the hardware acceleration of rectangular Blitting, resizing and transparency operations provided by Graphics Card /Blitting Module to provide speedy overlaying of Video.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The embodiment of the present invention is applicable in various applications, such as, media players, animations and gaming.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for overlaying videos, comprising:

creating a replica of primary data in a memory;

blitting the replica with overlay data to generate an overlaid video; and storing the overlaid video as the replica in the memory.

2. The method as claimed in claim 1, wherein the overlaid video is rasterized for at least one display.

3. The method as claimed in claim 1, wherein the blitting is implemented in one of a plurality of blending modes, and wherein the one blending mode is selected from a group consisting of a source color key process, an alpha blending process, and a raster operation.

4. The method as claimed in claim 1, wherein the blitting is configured for destination color transparency.

5. The method of overlaying videos as claimed in claim 1, wherein the blitting is configured for each of a plurality of destination clip rectangles.

6. A system for overlaying videos, comprising:

a first input module configured to provide a first video;

a second input module configured to provide a second video;

a blitting module operatively coupled to the first input module and the second input module and configured to blit the first video and the second video to generate an overlaid video; and an output module which is a replica of the first input module operatively coupled to the blitting module and configured to store the overlaid video.

7. The system as claimed in claim 6, further comprising:

a reset module, wherein the reset module is configured to reset the first input module upon receiving a deactivation signal and to reset the output module.

8. The system as claimed in claim 6, wherein the blitting module is operated in one of a plurality of blending modes selected from the group of a source color key blending process, a destination color transparency blending process, an alpha blending process and a raster operation.

9. The system as claimed in claim 6, wherein the size of a blitting rectangle configured in the blitting module is not equal to a size of an overlay buffer.

10. A method for overlaying videos, comprising:

storing, from an input, a primary data in a computer readable medium, wherein the primary data is obtained through an input module;

storing a replica of the primary data, wherein the replica of the primary data is stored in the computer readable medium;

blitting the replica with overlay data to generate an overlaid video;

storing the overlaid video in memory; and outputting the overlaid video through an output module.

11. The method as claimed in claim 10, wherein the overlaid video is rasterized for display.

12. The method as claimed in claim 10, wherein the blitting comprises at least one blending mode.

13. The method of overlaying videos as claimed in claim 10, wherein the blitting is configured for destination color transparency.

14. The method of overlaying videos as claimed in claim 10, wherein the blitting is configured for each of a plurality of destination clip rectangles.

15. The method of overlaying videos as claimed in claim 10, further comprising:

resetting the input module upon receiving a deactivation signal.

16. The method of overlaying videos as claimed in claim 10, further comprising:

resetting the output module on receiving a deactivation signal.

17. The method as claimed in claim 12, wherein the blending mode is a source color key blending mode.

18. The method as claimed in claim 12, wherein the blending mode is an alpha blending mode.

19. The method as claimed in claim 12, wherein the blending mode is a raster blending mode.

20. The method as claimed in claim 12, wherein the blending mode is configured for destination color transparency.

* * * * *